(12) United States Patent
Pongo

(10) Patent No.: US 7,695,074 B2
(45) Date of Patent: Apr. 13, 2010

(54) SINGLE APPLY HAND AND FOOT CONTROL BRAKING SYSTEM FOR AN ALL-TERRAIN VEHICLE

(75) Inventor: Harry Pongo, Gatzke, MN (US)

(73) Assignee: Polaris Industries, Inc., Medina, MN (US)

( * ) Notice: Subject to any disclaimer, the term of this patent is extended or adjusted under 35 U.S.C. 154(b) by 31 days.

(21) Appl. No.: 11/441,945

(22) Filed: May 26, 2006

(65) Prior Publication Data

US 2007/0273200 A1 Nov. 29, 2007

(51) Int. Cl.
*B60T 13/00* (2006.01)

(52) U.S. Cl. ............ 303/9.61; 303/9.62; 303/9.64; 474/202; 474/206; 474/212; 474/213; 474/214

(58) Field of Classification Search ............... 303/9.61, 303/9.62, 9.64
See application file for complete search history.

(56) References Cited

U.S. PATENT DOCUMENTS

| | | | |
|---|---|---|---|
| 1,567,982 A | 12/1925 | Pfeiffer | |
| 1,606,224 A | 11/1926 | Hoeller | |
| 2,313,991 A | 3/1943 | Fitch | |
| 3,159,974 A | 12/1964 | Rodgers | |
| 3,473,634 A | 10/1969 | Strifler et al. | |
| 3,486,591 A | 12/1969 | Scheffler | |
| 3,554,334 A | 1/1971 | Shimano | |
| 3,750,857 A | 8/1973 | Marschall et al. | |
| 3,868,001 A | 2/1975 | Yokoi | |
| 3,885,392 A | 5/1975 | Haraikawa | |
| 3,960,030 A | 6/1976 | Williams | |
| 3,999,807 A | 12/1976 | Haraikawa | |
| 4,024,932 A | 5/1977 | Fay | |
| 4,161,239 A | 7/1979 | Karasudani | |
| 4,174,867 A | 11/1979 | Oberthür | |
| 4,176,886 A | 12/1979 | Watanabe | |
| 4,189,190 A | 2/1980 | Luepertz | |
| 4,239,294 A * | 12/1980 | Burgdorf | 303/9.64 |
| 4,274,518 A | 6/1981 | Berisch | |
| 4,289,359 A | 9/1981 | Lüpertz et al. | |
| 4,465,322 A | 8/1984 | Hayashi | |
| 4,494,800 A | 1/1985 | Hayashi | |
| 4,598,954 A | 7/1986 | Hayashi | |
| 5,036,960 A | 8/1991 | Schenk et al. | |
| 5,219,211 A | 6/1993 | Tsuchida et al. | |
| 5,273,346 A * | 12/1993 | Tsuchida et al. | 303/2 |
| 5,363,943 A | 11/1994 | Iwashita et al. | |
| 5,372,408 A * | 12/1994 | Tsuchida et al. | 303/9.64 |
| 5,501,511 A * | 3/1996 | Wagner | 303/9.64 |
| 5,544,946 A * | 8/1996 | Toyoda et al. | 303/9.64 |
| 5,564,534 A | 10/1996 | Toyoda et al. | |
| 5,620,237 A * | 4/1997 | Iwashita et al. | 303/9.64 |

(Continued)

FOREIGN PATENT DOCUMENTS

FR 2843349 2/2004

(Continued)

*Primary Examiner*—Bradley T King
*Assistant Examiner*—James K Hsiao
(74) *Attorney, Agent, or Firm*—Baker & Daniels LLP

(57) ABSTRACT

The present invention generally relates to braking systems for all-terrain vehicles. More particularly, the present invention relates to hand and foot actuated braking control systems for all-terrain vehicles.

21 Claims, 12 Drawing Sheets

U.S. PATENT DOCUMENTS

| | | |
|---|---|---|
| 5,628,387 A | 5/1997 | Schantzen |
| 5,971,499 A | 10/1999 | Pape et al. |
| 6,092,877 A | 7/2000 | Rasidescu et al. |
| 6,390,566 B1 * | 5/2002 | Matsuno .................... 303/9.64 |
| 6,407,663 B1 | 6/2002 | Huggett |
| 6,478,103 B1 | 11/2002 | Matsuura |
| 6,772,864 B1 * | 8/2004 | Luh .......................... 188/152 |
| 6,793,295 B2 * | 9/2004 | Sakamoto .................. 303/9.64 |
| 6,802,400 B2 | 10/2004 | Ohura |
| 6,835,904 B2 | 12/2004 | McGuire et al. |
| 6,883,630 B2 * | 4/2005 | Morin ........................ 180/244 |
| 2002/0063010 A1 | 5/2002 | Morin |
| 2004/0035629 A1 | 2/2004 | Morin et al. |
| 2006/0152071 A1 * | 7/2006 | Takeuchi ................... 303/9.64 |

FOREIGN PATENT DOCUMENTS

| | | |
|---|---|---|
| TW | 484550 | 4/2002 |
| TW | 243401 Y | 9/2004 |
| TW | 247468 Y | 10/2004 |

* cited by examiner

SINGLE APPLY HAND AND FOOT CONTROL BRAKING SYSTEM FOR AN ALL-TERRAIN VEHICLE

FIELD OF THE INVENTION

The present invention generally relates to braking systems for all-terrain vehicles. More particularly, the present invention relates to hand and foot actuated braking control systems for all-terrain vehicles.

BACKGROUND OF THE INVENTION

Generally, most all-terrain vehicles (ATV's) include front and rear braking assemblies positioned on the front and rear axles of the ATV to allow the rider to slow or stop the vehicle. Typical brake assemblies may include hydraulically actuated calipers, drums, or another suitable type of braking element. Most ATV's have a hand actuated lever positioned on the handlebar to control the front brake assembly. Similarly, most ATV's have a foot actuated lever positioned by a rider's foot to control the rear brake assembly. Typically, the front and rear brake assemblies operate independently, thereby requiring a rider to apply both the hand lever and the foot lever to actuate both front and rear brake assemblies simultaneously. Generally, weight transfer toward the front of the ATV during braking requires the rider to apply more pressure to the front brake assemblies and less to the rear brake assemblies to prevent rear wheel lock-up when stopping the ATV. Inexperienced riders may find this practice difficult.

SUMMARY OF THE INVENTION

The present disclosure details a braking system that illustratively achieves four wheel braking whenever either a hand control or a foot control is activated.

One illustrative embodiment of the present disclosure includes an all terrain vehicle including an engine supported by a frame, front and rear axles supported by the frame, a transmission configured to transmit power from the engine to the at least one of the axles, and a braking system configured to stop the all terrain vehicle, the braking system including a front brake assembly operably coupled to the front axle, the front brake assembly including a first input, and a rear brake assembly operably coupled to the rear axle, the rear brake assembly including first and second inputs. First and second hydraulic master cylinders are configured to develop hydraulic pressure to actuate at least one of the front and rear brake assemblies to slow the all terrain vehicle, the second hydraulic master cylinder being in direct communication with the second input of the rear brake assembly. A distribution block is in communication with the first and second hydraulic master cylinders and the first input of each of the front and rear brake assemblies. The distribution block is adapted to distribute the hydraulic pressure received from the first master cylinder to the front and rear brake assemblies, the distribution block being further adapted to distribute the hydraulic pressure received from the second master cylinder to the front brake assembly.

Another illustrative embodiment of the present disclosure includes a braking system for an all terrain vehicle including a hand control, a foot control, a front brake assembly, a rear brake assembly, and a distribution block fluidly coupled to the hand control, the foot control, the front brake assembly, and the rear brake assembly. The distribution block is configured to receive fluid pressure input from the hand control to actuate both the front and rear brake assemblies. The distribution block is further configured to receive fluid pressure input from the foot control to actuate both the front and rear brake assemblies.

Yet another illustrative embodiment of the present disclosure includes an all terrain vehicle including an engine supported by a frame, front and rear axles supported by the frame, a transmission configured to transmit power from the engine to the at least one of the axles, and a braking system configured to stop the all terrain vehicle. The braking system includes a front brake assembly operably coupled to the front axle, the front brake assembly including a first input, and a rear brake assembly operably coupled to the rear axle, the rear brake assembly including first and second inputs. First and second hydraulic master cylinders are configured to develop hydraulic pressure to actuate at least one of the front and rear brake assemblies to slow the all terrain vehicle, the second hydraulic master cylinder being in direct communication with the second input of the rear brake assembly. A foot control is adapted to actuate one of the first and second master cylinders, and a hand control is adapted to actuate the other of the second and first master cylinders. A distribution block in communication with the first and second hydraulic master cylinders and the first input of each of the front and rear brake assemblies. The distribution block is adapted to distribute the hydraulic pressure received from the first master cylinder to the front and rear brake assemblies, the distribution block being further adapted to distribute the hydraulic pressure received from the second master cylinder to the front brake assembly.

According to yet another illustrative embodiment of the present disclosure, an all terrain vehicle includes an engine supported by a frame, front and rear axles supported by the frame, a transmission configured to transmit power from the engine to the at least one of the axles, and a braking system configured to stop the all terrain vehicle. The braking system includes a front brake assembly operably coupled to the front axle, and a rear brake assembly operably coupled to the rear axle. A first hydraulic master cylinder is configured to develop hydraulic pressure to simultaneously actuate the front and rear brake assemblies. A second hydraulic master cylinder is configured to develop hydraulic pressure to simultaneously actuate the front and rear brake assemblies. A foot control is adapted to actuate the first master cylinder, and a hand control is adapted to actuate the second master cylinder.

The above mentioned and other features of this invention, and the manner of attaining them, will become more apparent and the invention itself will be better understood by reference to the following description of embodiments of the invention taken in conjunction with the accompanying drawings.

Figure 1:
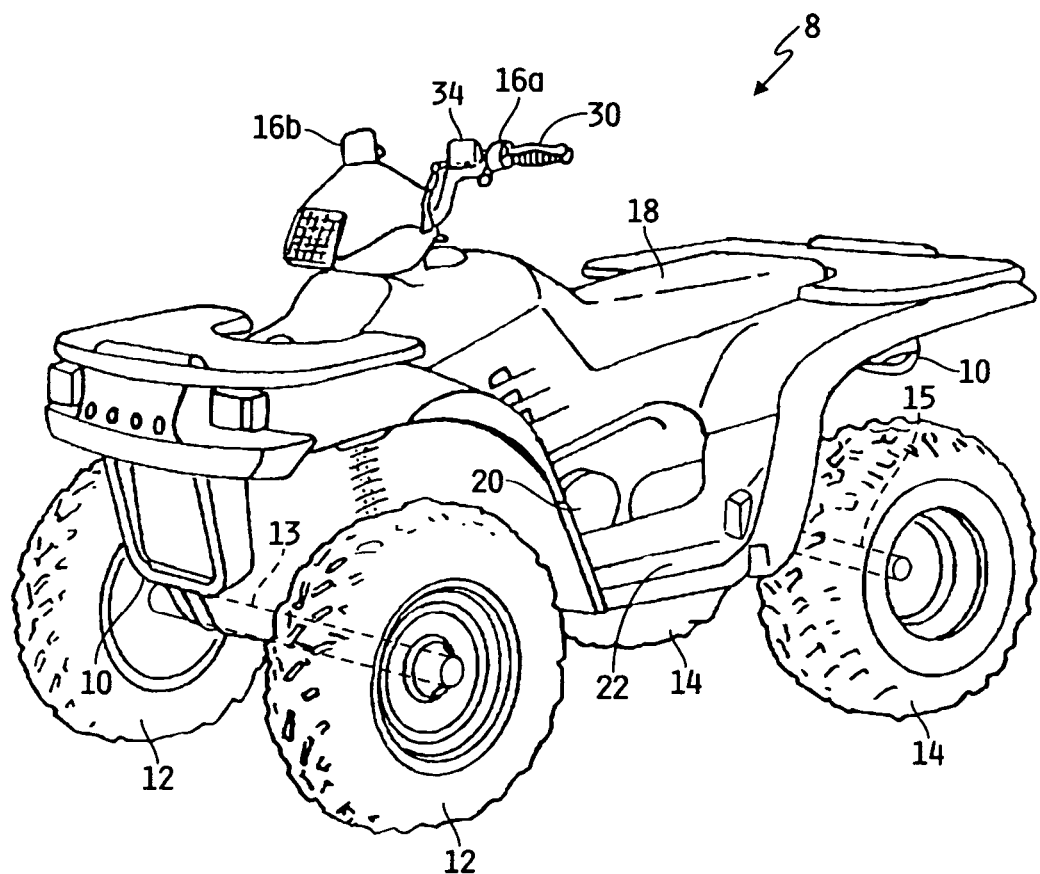
FIG. 1 is a perspective view of an illustrative embodiment ATV including a braking system of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a braking system for an ATV, it should be understood that the principles of the invention apply equally to other braking systems. While the present invention primarily involves an ATV, it should be understood, however, that the invention may have application to other types of vehicles, such as motorcycles, utility vehicles, scooters, and mopeds.

Figure 8:
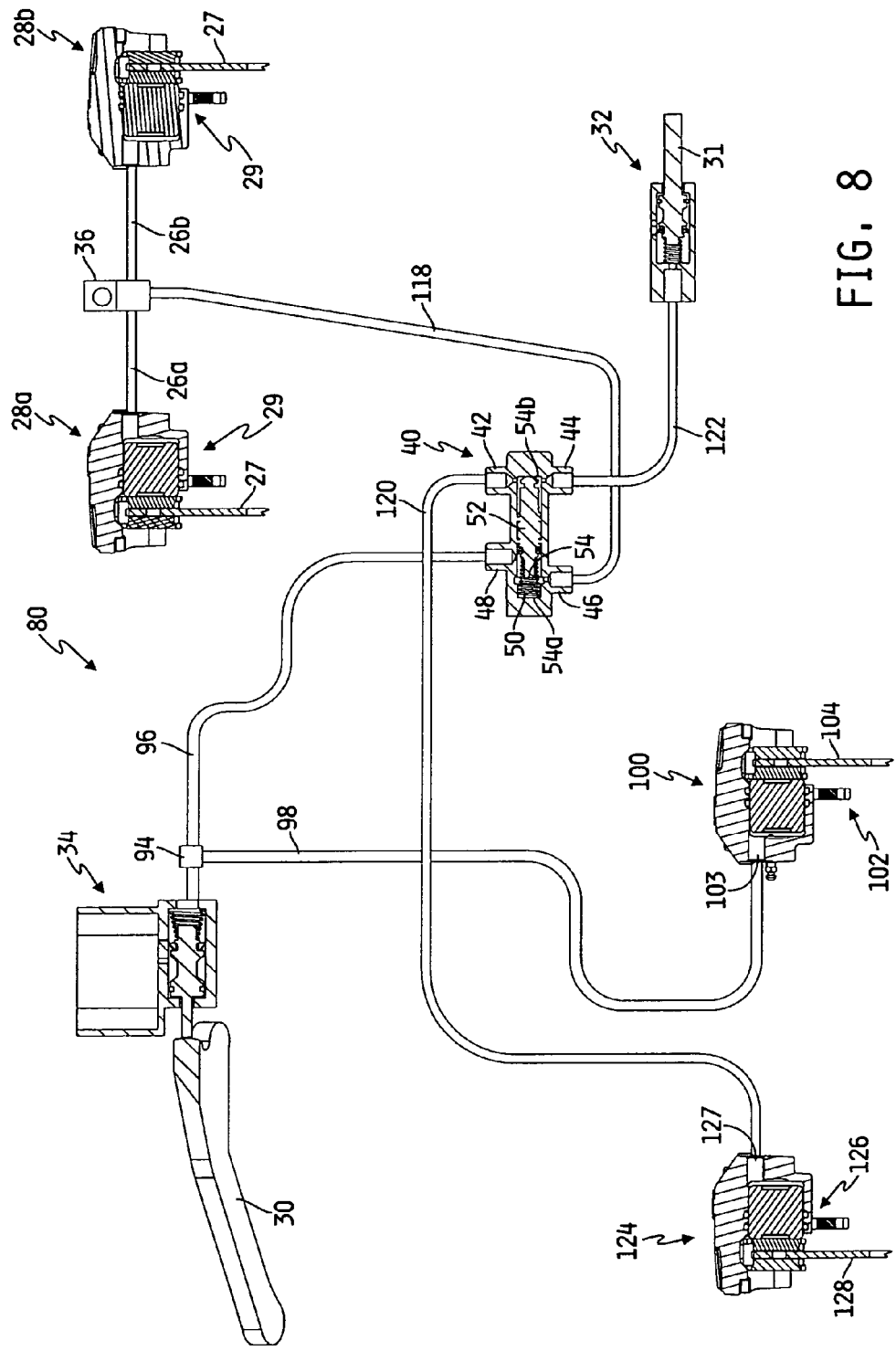
FIG. 8 is a schematic view of the components of another illustrative embodiment braking system of the present disclosure.
Figure 9:
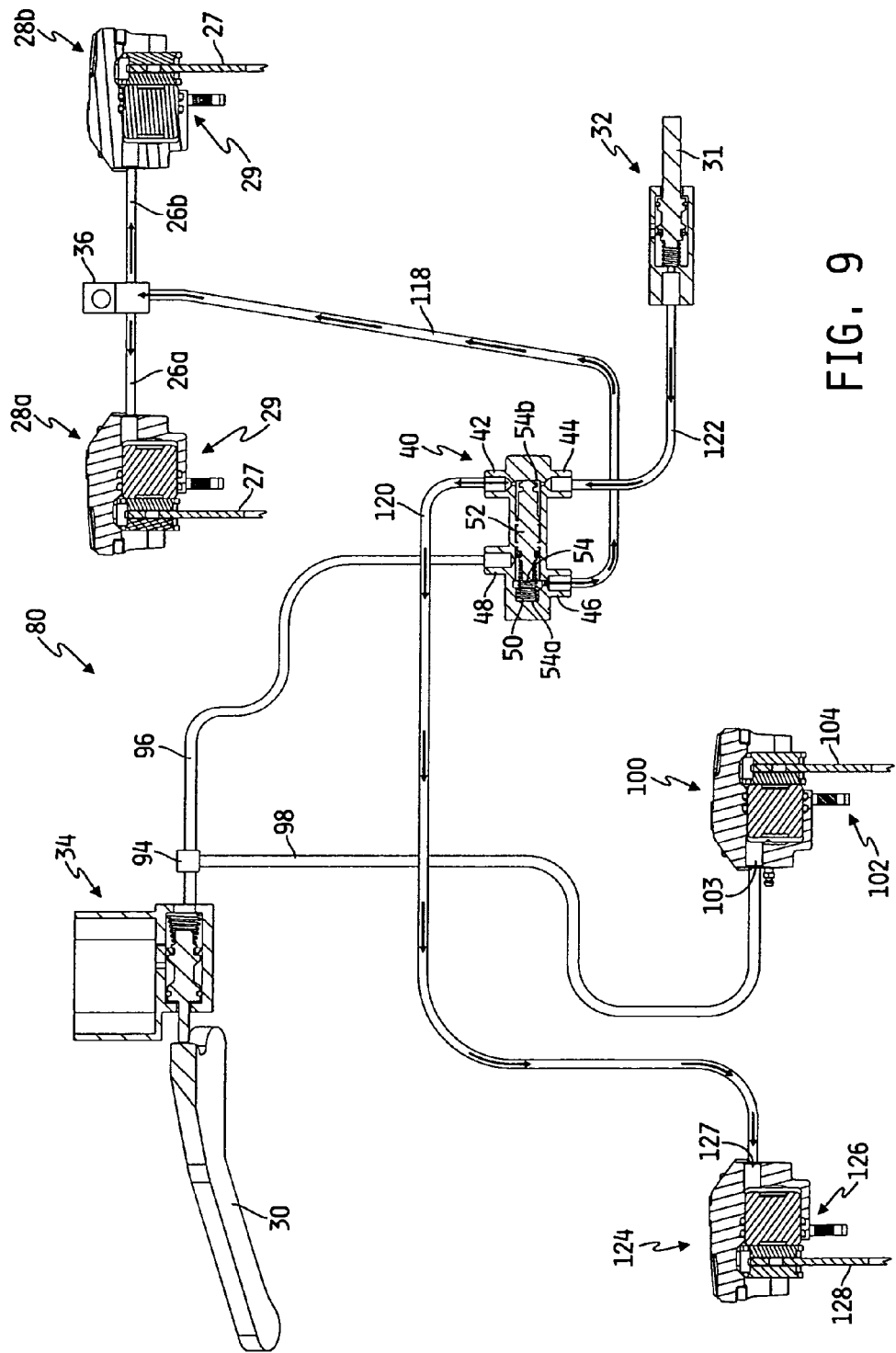
FIG. 9 is a schematic view of the braking system shown in FIG. 8 when only the front master cylinder is actuated.
Figure 10:
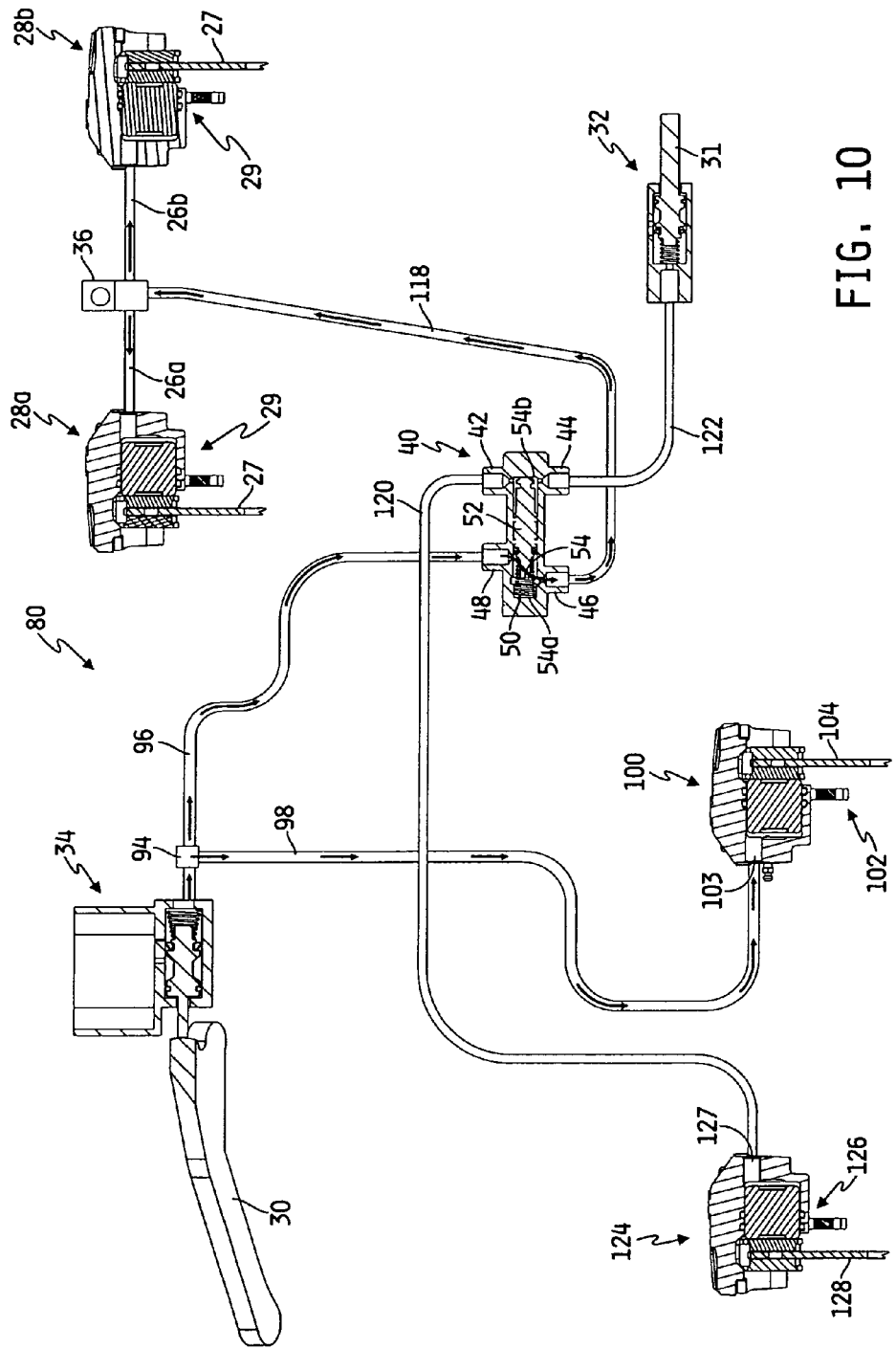
FIG. 10 is a schematic view of the braking system shown in FIG. 8 when only the rear master cylinder is actuated.

Referring to FIG. 1, one illustrative embodiment of an ATV 8 that includes a braking system of the present disclosure is shown. ATV 8 includes a chassis or frame, designated generally by reference numeral 10, to which the various systems and components of the vehicle are attached. These components include front wheels 12, rear wheels 14 (both having corresponding tires), handlebars 16a, 16b connected by a suitable steering linkage to the front wheels 12 for steering the vehicle, and a straddle-type seat 18, illustratively designed for a single rider. A power train 20, including an engine and a transmission, are carried on the chassis 10 generally beneath the straddle-type seat 18 and substantially between a pair of footrests (only the left footrest 22 is visible in FIG. 1). The transmission is configured to transmit power to at least one of a front axle 13 supporting front wheels 12 and a rear axle 15 supporting rear wheels 14. As detailed herein, rear axle 15 may be a differential rear axle (FIGS. 2-7) or a common axle (FIGS. 8-10).

Figure 2:
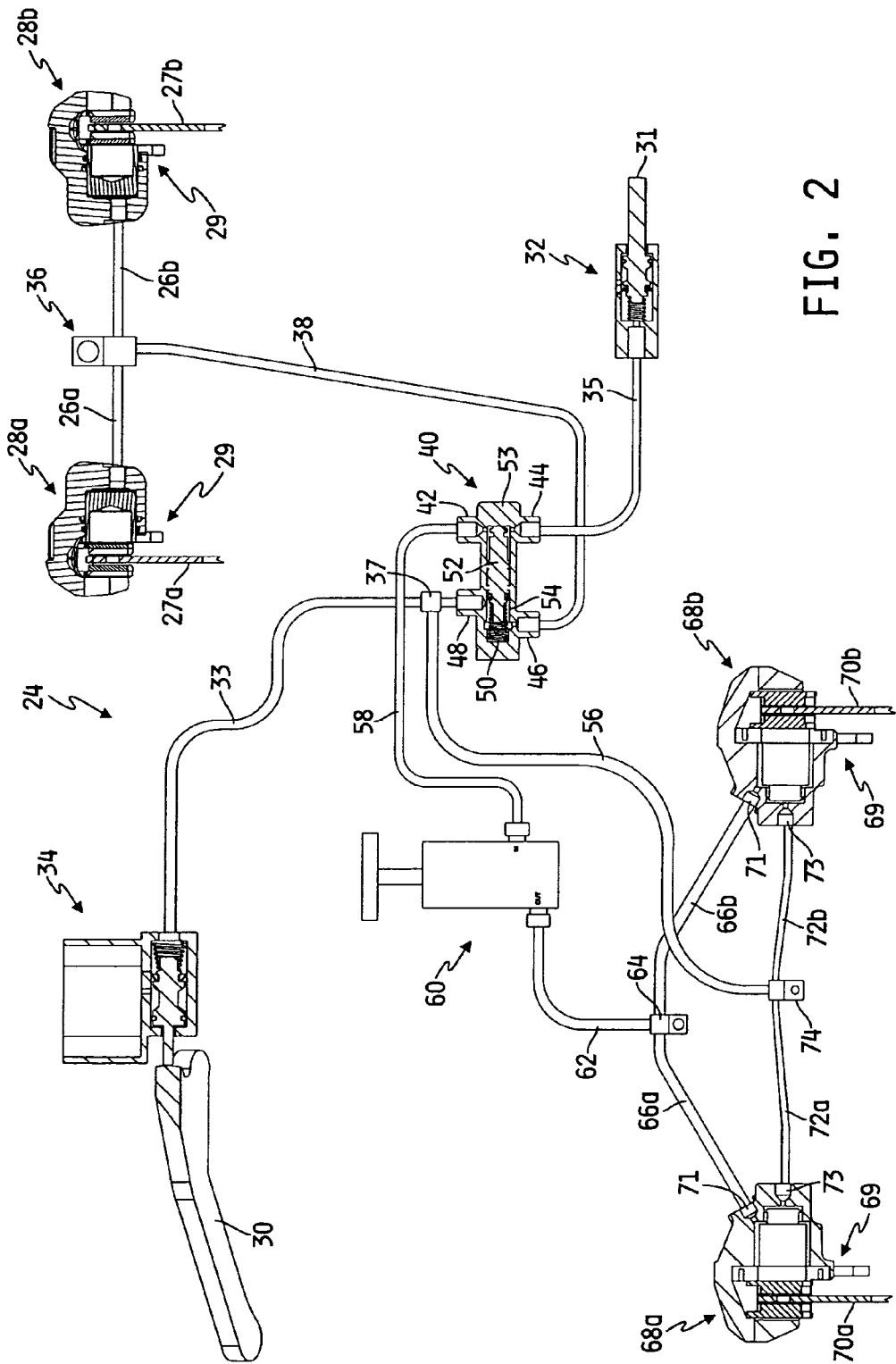
FIG. 2 is a schematic view of the components of an illustrative embodiment braking system of the present disclosure.

Referring now to FIG. 2, one illustrative embodiment braking system of the present disclosure is shown. Braking system 24 may be used on any suitable vehicle such as ATV 8, shown in FIG. 1, a motorcycle, a utility vehicle, or a go-kart. Braking system 24 includes front brake assemblies 28a, 28b, distribution block 40, rear brake assemblies 68a, 68b, proportioning valve 60, rear or first master cylinder 32, and front or second master cylinder 34. Front master cylinder 34 is mounted to handlebar 16a of the ATV 8 (typically adjacent the left handlebar grip), and includes a pivotable hand lever 30 which may be depressed by the rider to slow the ATV 8. Rear master cylinder 32 is positioned adjacent to a footrest of the ATV 8 (typically adjacent the right footrest 22) and includes pivotable lever 31 which may be actuated by a rider's foot to slow the ATV 8.

Although any type of brake assembly may be utilized in connection with braking system 24, in the illustrative embodiment both front brake assemblies 28a, 28b and rear brake assemblies 68a, 68b are disc brakes. More particularly, front brake assemblies 28a, 28b are positioned around brake discs or rotors 27a, 27b mounted on front axle 13 of the ATV 8. Each front brake assembly 28a, 28b, includes a front brake caliper 29 supported by chassis 10 and which is positioned to cooperate with a respective brake disc 27a, 27b. Such disc brake assemblies are well-known in the art. Each front brake caliper 29 comprises a slave hydraulic cylinder including a piston and configured to receive pressurized hydraulic fluid from brake lines 26a, 26b, respectively.

Rear brake assemblies 68a, 68b also illustratively comprise disc brakes having brake discs or rotors 70a, 70b which are mounted on rear axle 15 of the ATV 8. Each brake assembly 68a, 68b further includes a rear brake caliper 69 supported by chassis 10 and which is positioned to cooperate with a respective brake disc 70a, 70b. Illustratively, calipers 69 are dual input calipers and each include a pair of inputs 71 and 73. Rear brake calipers 69 each comprise a slave hydraulic cylinder including a piston and configured to receive pressurized hydraulic fluid from brake lines 66 and 72, respectively. Additional details of illustrative embodiment dual input rear brake calipers 69 are provided in U.S. Pat. No. 6,092,877, the disclosure of which is expressly incorporated by reference herein. In the illustrative embodiment of FIGS. 2-7, the rear axle 15 of the ATV 8 includes a differential to power both rear wheels 14. As such, two rear brake assemblies 68a, 68b are provided to facilitate braking of both rear wheels 14. It should be appreciated that braking system 24 may also be used with a common rear axle 15.

Figure 3:
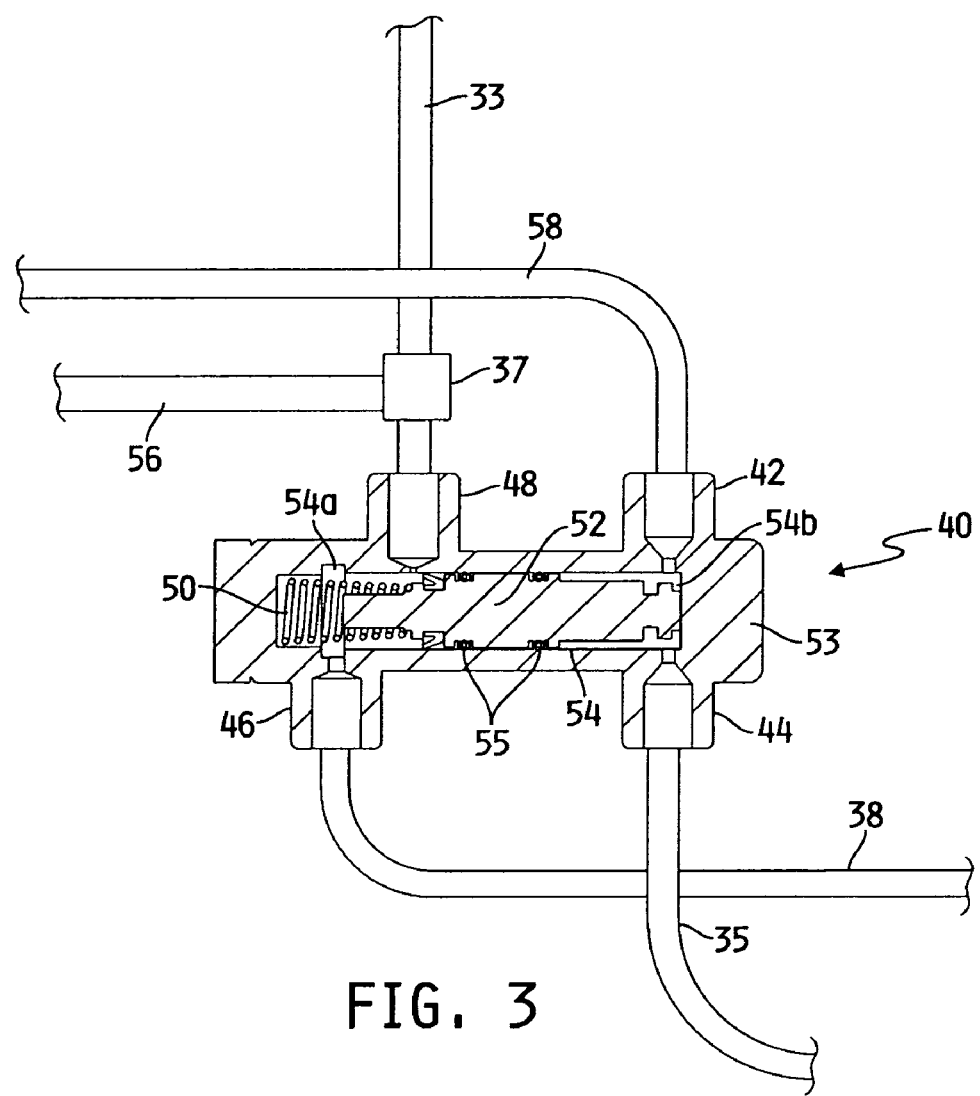
FIG. 3 is a cross-sectional view of an illustrative embodiment distribution block of the braking system shown in FIG. 2.

Referring now to FIGS. 2 and 3, distribution block 40 includes inlets 44 and 48 and outlets 42 and 46. Distribution block 40 illustratively comprises a slave hydraulic cylinder including a body 53 defining cavity 54, a spring 50 received within the cavity 54, and a piston 52 biased by spring 50. More particularly, the illustrative embodiment distribution block 40 is a one-way slave cylinder type distribution block. Input 48 is fluidly coupled to brake line 33 and receives pressurized hydraulic fluid from front master cylinder 34 when hand lever 30 is actuated. Input 44 is coupled to brake line 35 and receives pressurized hydraulic fluid from rear master cylinder 32 when lever 31 is actuated by a rider's foot. Spring 50 is biased between piston 52 and an end of distribution block 40 to maintain piston 52 in a default position within distribution block 40, as shown in FIG. 3. Piston 52 supports annular seals 55 which are configured to fluidly seal output 42 and inlet 44 from outlet 46 and inlet 48 of distribution block 40. Also, when in the default position, piston 52 and body 53 of distribution block 40 cooperate to define known volumes of a first portion 54a and a second portion 54b of cavity 54 (FIG. 3). The operation of distribution block 40 is explained in more detail below.

Output 46 of distribution block 40 is fluidly coupled to brake line 38 which, in turn, is fluidly coupled to distribution block 36. In this embodiment, distribution block 36 is a "T" and divides the flow of hydraulic fluid in brake line 38 between brake lines 26a and 26b. Brake lines 26a and 26b are fluidly coupled to front brake assemblies 28a and 28b, respectively. Output 42 of distribution block 40 is fluidly coupled to brake line 58. In this embodiment, brake line 58 is coupled to proportioning valve 60. Proportioning valve 60 may be used to control or decrease the pressure of the hydraulic fluid supplied by brake line 58 before it exits proportioning valve 60 through brake line 62. In alternative embodiments, proportioning valve 60 is removed from braking system 24. Brake line 62 is coupled to distribution block 64 which is a "T" and splits the hydraulic fluid flow to brake lines 66a and 66b. Each brake line 66a and 66b is coupled to a respective input 71 of rear brake assemblies 68a and 68b.

Distribution block 37 is coupled to brake line 33 to receive pressurized hydraulic fluid from front master cylinder 34. Distribution block 37 is a "T" and splits the hydraulic fluid flow from brake line 33 between input 48 of distribution block 40 and brake line 56. Brake line 56 is coupled to distribution block 74 which is coupled to brake lines 72a and 72b. Distribution block 74 is also a "T" and splits the hydraulic fluid flow from brake line 56 to brake lines 72a and 72b. Each brake line 72a and 72b is coupled to a respective input 73 of rear brake assemblies 68a and 68b.

Figure 4:
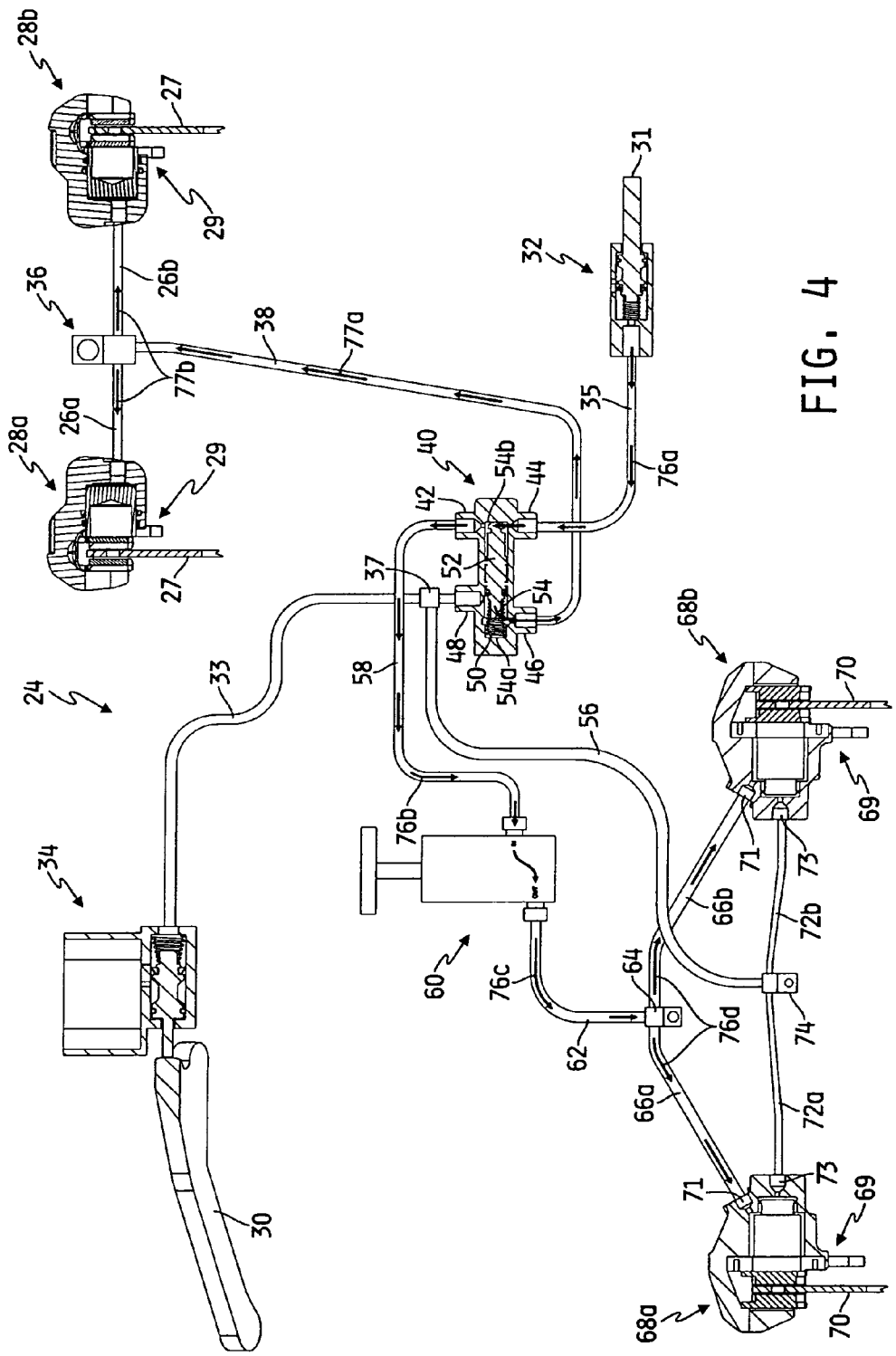
FIG. 4 is a schematic view of the braking system shown in FIG. 2 when only the front master cylinder is actuated.

Referring now to FIGS. 4-7, operation of illustrative braking system 24 will be described. In FIG. 4, the rider of the ATV 8 has actuated only rear master cylinder 32 of braking system 24 by operating lever 31 to slow the ATV 8. Pressurized hydraulic fluid from rear master cylinder 32 flows to input 44 of distribution block 40 through brake line 35, as represented by arrows 76a. A portion of the fluid exits distribution block 40 through output 42 and brake line 58, as represented by arrows 76b. The fluid then passes through proportioning valve 60 as shown by arrows 76c, where the pressure of the fluid is controlled into brake line 62. The fluid is then divided into brake lines 66a and 66b by distribution block 64 (arrows 76d). The fluid next enters rear brake assemblies 68a and 68b through inputs 71 and pressurizes rear calipers 69 to apply pressure to discs 70 to slow the ATV 8. Another portion of fluid from rear master cylinder 32 fills second portion 54b of cavity 54 and applies pressure against piston 52 and spring 50. When the pressure of the fluid in cavity second portion 54b exceeds the pressure applied by spring 50, piston 52 is compressed against spring 50 to increase the volume of cavity second portion 54b, thereby decreasing the volume of first cavity portion 54a and forcing fluid out of output 46, as shown by arrows 77a. Pressurized hydraulic fluid then flows from distribution block 40 into brake line 38 through output 46. The fluid is then divided by distribution block 36 into brake lines 26a and 26b (arrows 77b). Brake lines 26a and 26b supply the pressurized fluid to front brake calipers 29 which apply pressure to discs 27 to slow the ATV 8. In this embodiment, the rider of the ATV 8 was able to apply calipers 29 and 69 of both the front and rear brake assemblies 28 and 68 using only the foot actuated rear master cylinder 32.

Figure 5:
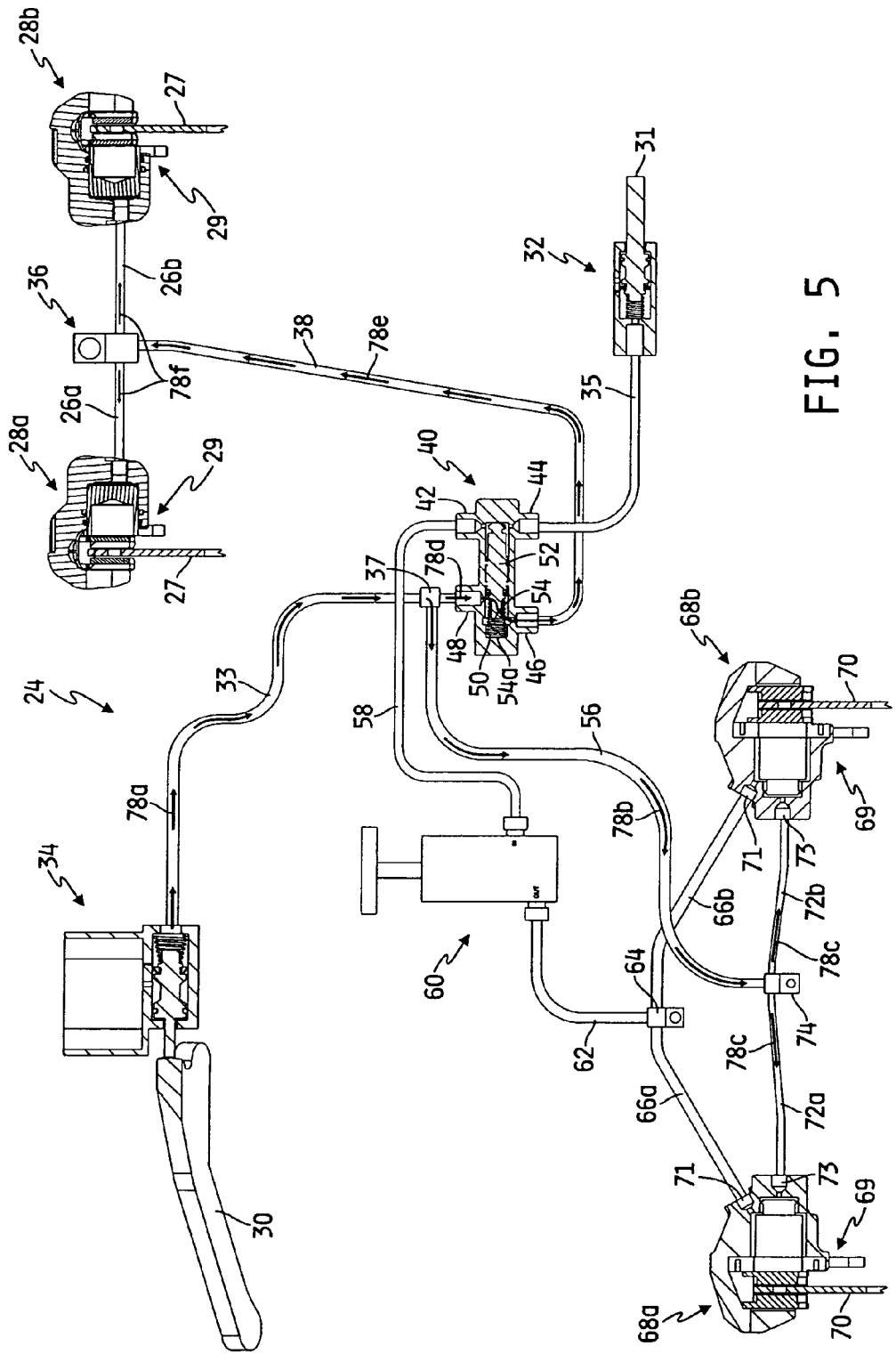
FIG. 5 is a schematic view of the braking system shown in FIG. 2 when only the rear master cylinder is actuated.

Referring now to FIG. 5, the rider of the ATV 8 has actuated only the front master cylinder 34 of braking system 24 by operating hand lever 30 to slow the ATV 8. Pressurized hydraulic fluid from front master cylinder 34 flows to distribution block 37 through brake line 33, as represented by arrows 78a. A portion of the fluid exits distribution block 37 through brake line 56 and flows to distribution block 74, as represented by arrows 78b. This portion of the fluid then passes through distribution block 74 into brake lines 72 (arrows 78c). The fluid then enters rear brake assemblies 68 through respective inputs 73 and pressurizes rear calipers 69 to apply pressure to discs 70 to slow the ATV 8. Another portion of fluid (arrows 78d) from front master cylinder 34 enters input 48 of distribution block 40 and fills cavity first portion 54a. The fluid from front master cylinder 34 applies pressure against piston 52 in the same direction as the biasing force of spring 50. Pressurized hydraulic fluid flows from distribution block 40 into brake line 38 through output 46 as represented by arrows 78e. The fluid is then divided by distribution block 36 into brake lines 26 (arrows 78f). Brake lines 26 supply the pressurized fluid to front brake calipers 29 which apply pressure to discs 27 to slow the ATV 8. In this embodiment, the rider of the ATV 8 was able to apply both the front and rear brake calipers 29 and 69 using only hand actuated front master cylinder 34.

Figure 6:
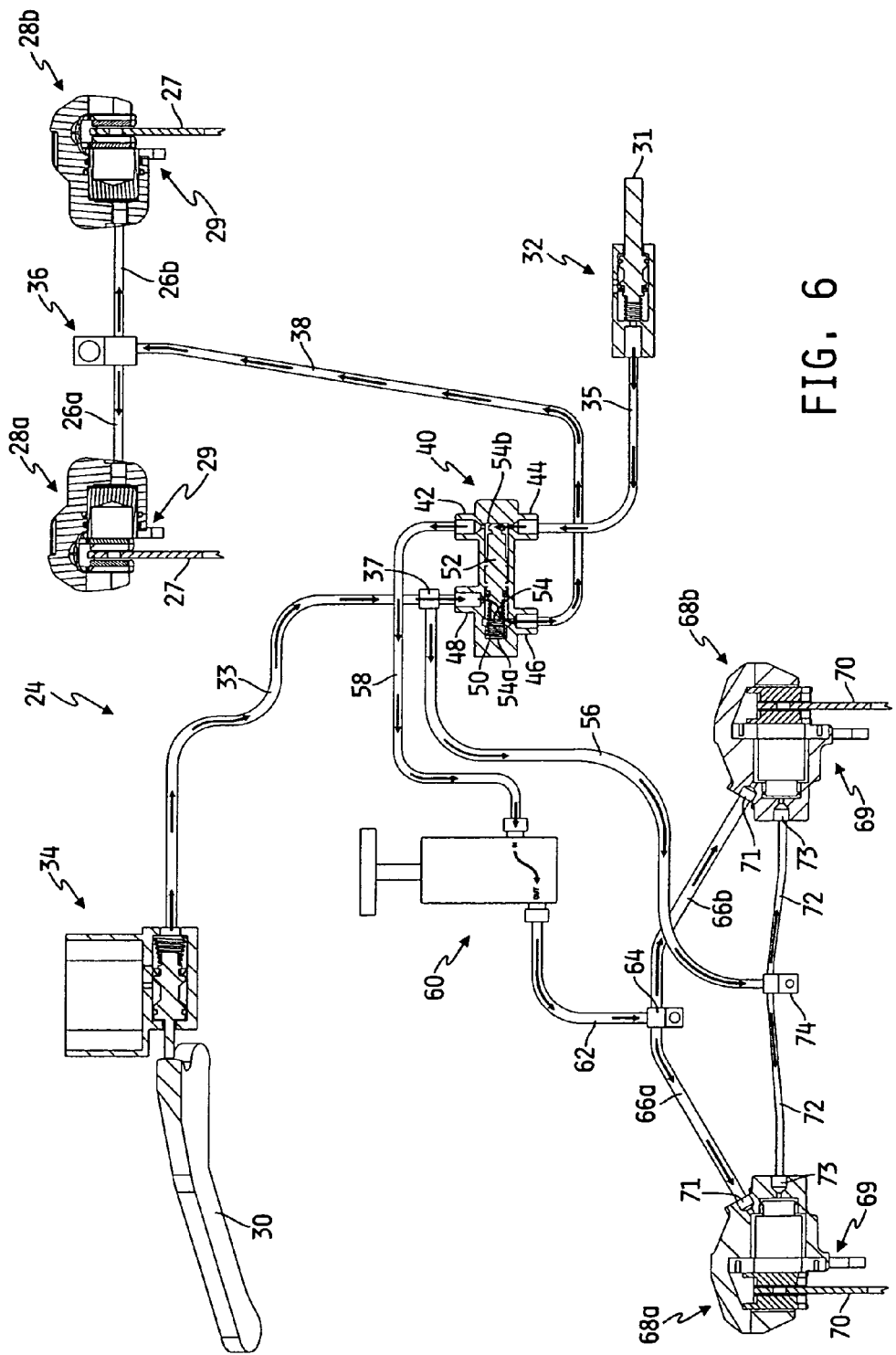
FIG. 6 is a schematic view of the braking system shown in FIG. 2 when both the front and rear master cylinders are actuated, the front master cylinder being actuated prior to the rear master cylinder.

Referring now to FIG. 6, braking system 24 is shown when the ATV rider has actuated both front and rear master cylinders 34 and 32. In the illustrated mode of operation of FIG. 6, front master cylinder 34 is actuated prior to rear master cylinder 32. As shown, pressurized fluid from front master cylinder 34 flows to distribution block 37 in brake line 33. There the fluid is divided by distribution block 37 where a first portion exits to brake line 56 and a second portion exits to input 48 of distribution block 40. As discussed above, fluid from brake line 56 is divided in distribution block 74 and supplied to respective inputs 73 of rear brake assemblies 68a and 68b to slow the ATV 8. At the same time, the second portion of fluid from line 33 flows through cavity first portion 54a of distribution block 40 and exits through output 46. The fluid is then divided at distribution block 36 and supplied to front calipers 29 to slow the ATV 8.

As discussed above, in the illustrated mode of operation illustrated in FIG. 6, the rider first actuated hand lever 30 to actuate front master cylinder 34, then subsequently actuated rear master cylinder 32 with lever 31. Pressurized fluid flows from rear master cylinder 32 through brake line 35 into input 44 of distribution block 40. The fluid then passes through cavity second portion 54b of distribution block 40 and output 42 to proportioning valve 60. The controlled fluid then exits proportioning valve 60 and is divided by distribution block 64 into brake lines 66a and 66b. Lines 66a and 66b supply the pressurized fluid to respective inputs 71 of rear brake assemblies 68a and 68b to provide additional pressure to slow the ATV 8. The dual input design of rear calipers 69 in cooperation with distribution block 40 prevent pressurized hydraulic fluid from one of the master cylinders 32, 34 from applying damaging backpressure on the other master cylinder 34, 32 when both master cylinders 32, 34 are actuated.

Figure 7:
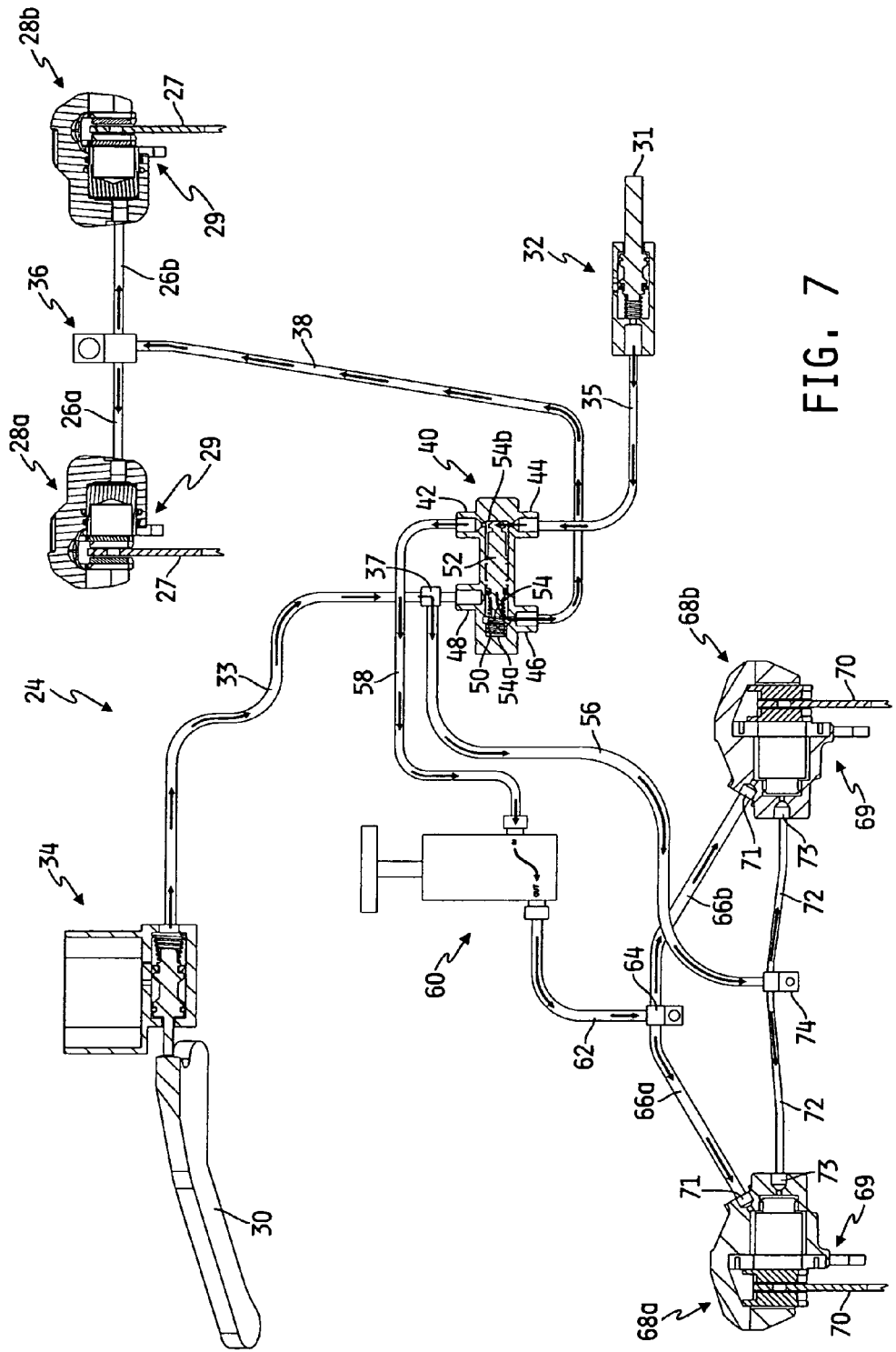
FIG. 7 is a schematic view of the braking system shown in FIG. 2 when both the front and rear master cylinders are actuated, the rear master cylinder being actuated prior to the front master cylinder.

Referring now to FIG. 7, braking system 24 is shown when the ATV rider has actuated both front and rear master cylinders 34 and 32. In the illustrated mode of operation of FIG. 7, rear master cylinder 32 is actuated prior to front master cylinder 34. This mode of operation is similar to the embodiment described in FIG. 6, with the exceptions that fluid from rear master cylinder 32 pressurizes distribution block 40, causing fluid flow to both front brake assemblies 28a and 28b through output 46 and to rear brake assemblies 68a and 68b through brakes lines 58, 62, 66, and inputs 71. Additionally, pressurized fluid from front master cylinder 34 is supplied to rear brake assemblies 68a and 68b through brake lines 33, 56, 72, and inputs 73.

With further reference to FIG. 7, pressurized fluid from rear master cylinder 32 flows to input 44 of distribution block 40 through brake line 35. A portion of the fluid exits distribution block 40 through output 42 and brake line 58. The fluid then passes through proportioning valve 60, where the pressure of the fluid is controlled into brake line 62. The fluid is then divided into brake lines 66a, 66b by distribution block 64. The fluid next enters rear brake assemblies 68a and 68b through inputs 71 and pressurizes rear calipers 69 to apply pressure to discs 70 to slow the ATV 8. Another portion of fluid from rear master cylinder 32 fills cavity 54 and applies pressure against piston 52 and spring 50. When the pressure of the fluid in cavity second portion 54b exceeds the pressure applied by spring 50, piston 52 is compressed against spring 50 to increase the volume of cavity 54b, decrease the volume of cavity 54a, and force fluid out of output 46. Such movement of the piston 52 (to the left in FIG. 7) closes or seals input 48 from fluid communication with cavity 54a. Pressurized hydraulic fluid then flows from distribution block 40 into brake line 38 through output 46. The fluid is then divided by distribution block 36 into brake lines 26a and 26b. Brake lines 26a and 26b supply the pressurized fluid to front brake calipers 29 which apply pressure to discs 27 to slow the ATV 8.

With further reference to FIG. 7, pressurized hydraulic fluid from front master cylinder 34 flows to distribution block 37 through brake line 33. Since inlet 48 of distribution block 40 is sealed by piston 52 as detailed above, all of the fluid passes from distribution block 37 through brake line 56 and flows to distribution block 74. The fluid then passes through distribution block 74 into brake lines 72a and 72b and enters rear brake assemblies 68a and 68b through respective inputs 73. The fluid pressurizes rear calipers 69 to apply pressure to discs 70 and slow the ATV 8. As discussed above, the dual input design of rear calipers 68 in cooperation with distribution block 40 prevent pressurized hydraulic fluid from one of the master cylinders 32, 34 from applying damaging backpressure on the other master cylinder when both master cylinders 32, 34 are actuated.

Referring now to FIGS. 8-10, another illustrative embodiment braking system 80 for an ATV is shown. Braking system 80 includes front master cylinder 34, rear master cylinder 32, distribution block 40, front brake assemblies 28a and 28b, and rear brake assemblies 100 and 124. Braking system 80 is configured to be used on ATV's having non-differential rear axle systems. In one illustrative embodiment, braking system 80 may include a proportional valve configured to control the pressure of the pressurized hydraulic fluid output from front and rear master cylinders 34 and 32. Braking system 80 is similar to braking system 24, as described above, with the exception that dual input rear calipers 69 have been replaced with single input rear calipers 102 and 126. Each of rear calipers 102 and 126 include single inputs 103 and 127.

Referring now to FIGS. 9 and 10, the operation of braking system 80 is described. In FIG. 9, the ATV rider operates only foot actuated rear master cylinder 32 with lever 31. Pressurized fluid exits rear master cylinder 32 through brake line 122 and enters distribution block 40 through input 44. A portion of the fluid exits output 42 of distribution block 40 and enters brake line 120. This portion of the fluid is then delivered to input 127 of rear brake assembly 124 to actuate rear caliper 126 to apply pressure to disc 128 to slow the ATV. Another portion of the fluid from rear master cylinder 32 fills cavity 54b of distribution block 40 until the bias applied to piston 52 by spring 50 is overcome. Spring 50 is compressed and piston 52 is retracted thereby forcing fluid from cavity 54a through output 46 of distribution block 40. The fluid then flows from output 46 into brake line 118. The fluid from brake line 118 is divided by distribution block 36 into brake lines 26a and 26b which supply front brake assemblies 28a and 28b with pressurized hydraulic fluid to apply pressure to discs 27 to slow the ATV. In this embodiment of braking system 80, the rider has applied only foot actuated rear master cylinder 32 to apply both front calipers 29 and single rear caliper 126.

In FIG. 10, the ATV rider operates only hand actuated front master cylinder 34 with lever 30. Pressurized fluid exits front master cylinder 34 into distribution block 94 which splits the fluid into brake lines 96 and 98. Fluid from brake line 98 is then delivered to input 103 of rear brake assembly 100 to actuate rear caliper 102 to apply pressure to disc 104 to slow the ATV. Fluid from brake line 96 is delivered to input 48 of distribution block 40. The fluid passes through cavity first portion 54a of distribution block 40 and from output 46 into brake line 118. The fluid from brake line 118 is divided by distribution block 36 into brake lines 26a and 26b which supply front calipers 29 with pressurized hydraulic fluid to apply pressure to discs 27 to slow the ATV. In this embodiment of braking system 80, the rider has applied only hand actuated front master cylinder 34 to apply both front calipers 29 and single rear caliper 102. As detailed above, the rear wheels 14 are coupled by a common rear axle 15 such that actuation of a single rear brake assembly 100, 124 is sufficient to brake both rear wheels 14.

Figure 11:
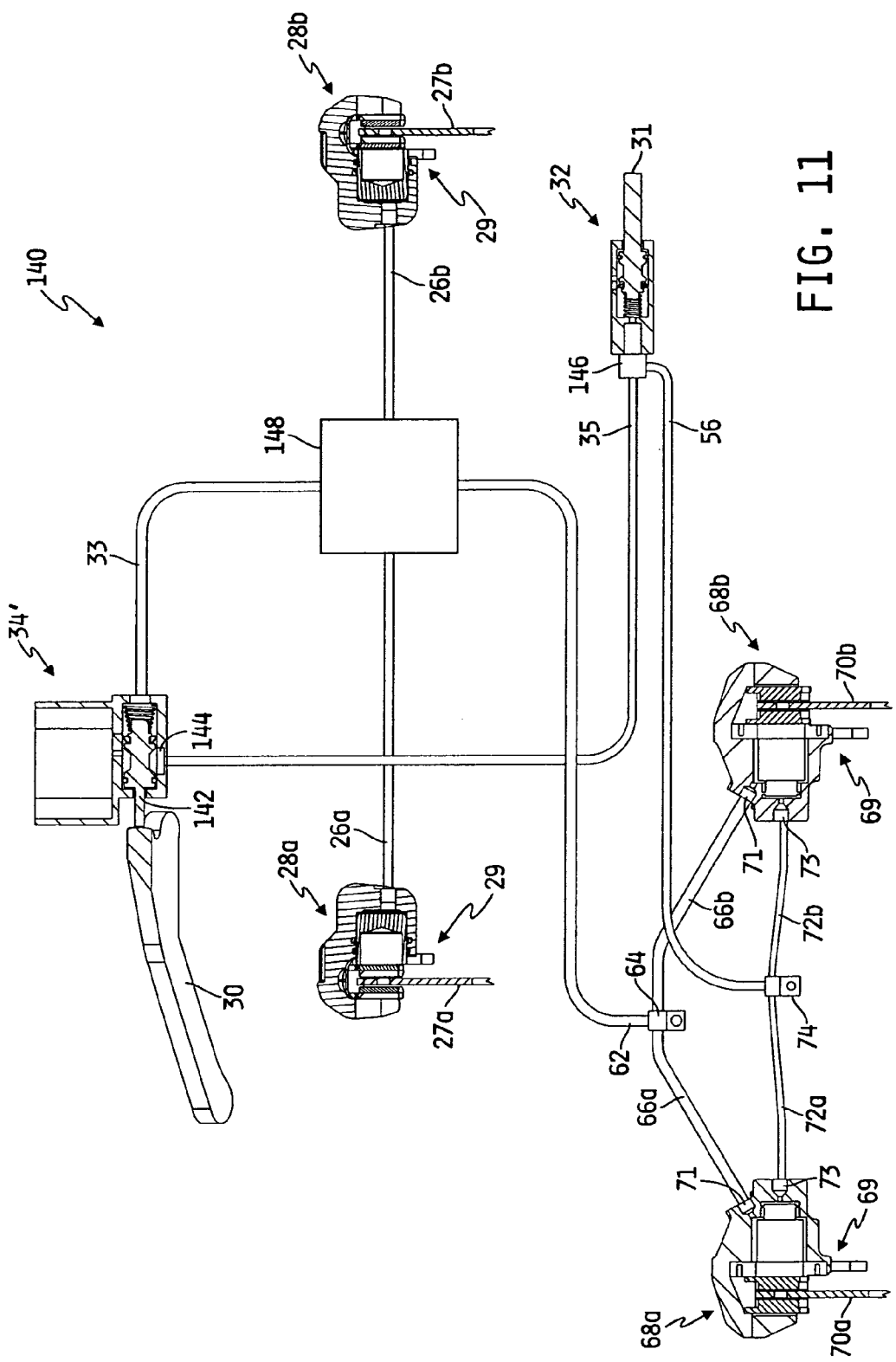
FIG. 11 is a schematic view of the components of another illustrative embodiment braking system of the present disclosure.

FIG. 11 illustrates a further illustrative embodiment braking system 140 for an ATV. As with previously detailed embodiments, braking system 140 includes a front master cylinder 34', a rear master cylinder 32, front brake assemblies 28a and 28b, and rear brake assemblies 68a and 68b. The front master cylinder 34' is a dual input master cylinder having a first input 142 operably coupled to the hand lever 30 in the manner detailed herein, and a second input 144 fluidly coupled to an output 146 of the rear master cylinder 32. The front master cylinder 34' outputs pressurized fluid to brake line 33 which is fluidly coupled to a distribution block 148. Pressurized fluid is supplied by the distribution block 148 to brake lines 26a, 26b, and 62 and therefore to front brake assemblies 28a and 28b, and rear brake assemblies 68a and 68b, respectively. The rear master cylinder 32 outputs pressurized fluid to brake lines 35 and 56 which are fluidly coupled to front master cylinder 34' and second inputs 73 of rear brake assemblies 68a and 68b.

In operation, activation of hand lever 30 causes front master cylinder 34' to supply pressurized fluid to distribution block 148. Pressurized fluid is supplied by distribution block 148 to the inputs of the front brake assemblies 28a and 28b and simultaneously to the first inputs 71 of the rear brake assemblies 68a and 68b. Activation of the foot lever 31 causes rear master cylinder 32 to supply pressurized fluid to the second inputs 73 of the rear brake assemblies 68a and 68b and simultaneously to the second input 144 of the front master cylinder 34'. The application of pressurized fluid at the second input 144 causes the front master cylinder 34' to output pressurized fluid to the distribution block 148, resulting in the activation of front brake assemblies 28a and 28b.

Figure 12:
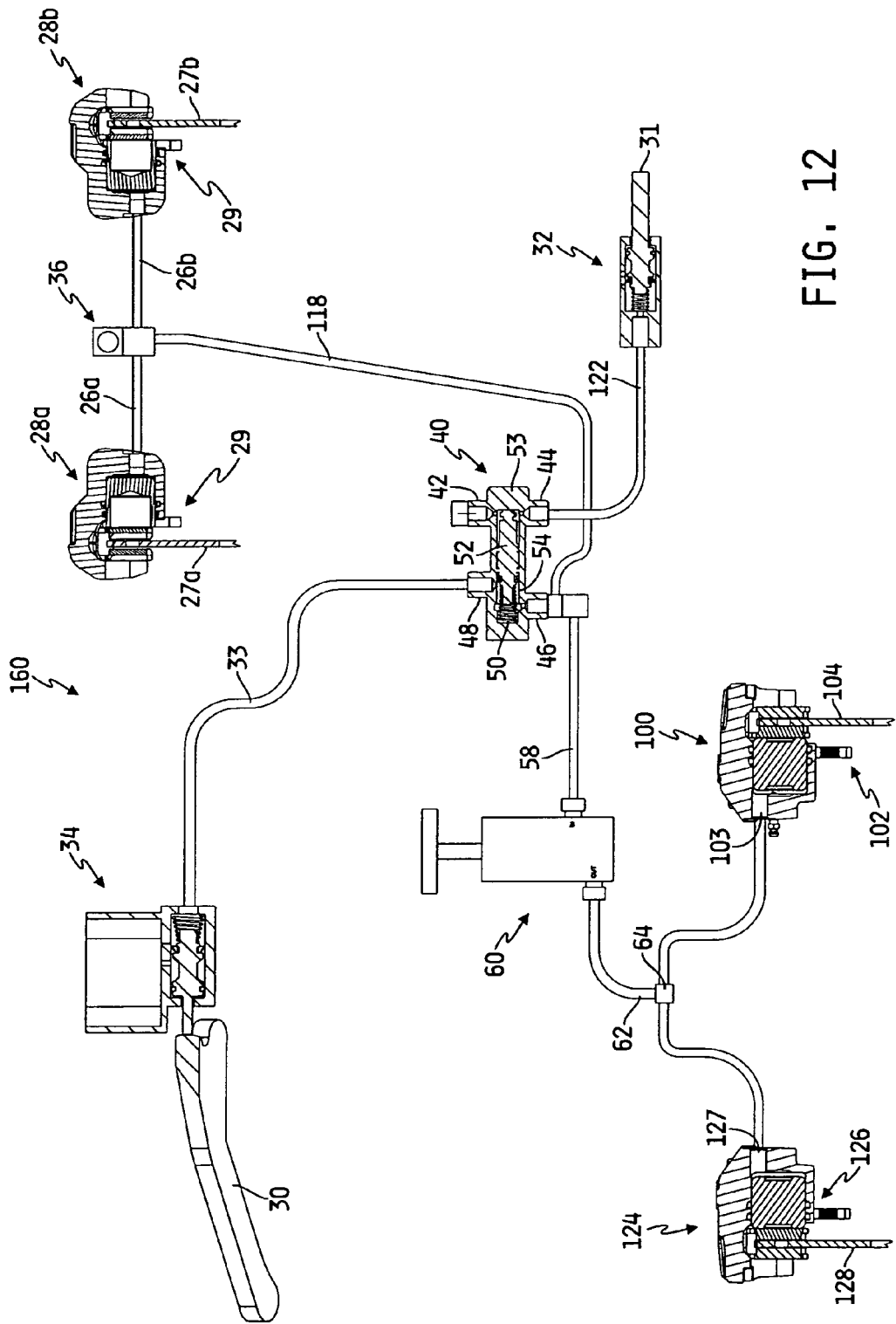
FIG. 12 is a schematic view of the components of a further illustrative embodiment braking system of the present disclosure.

FIG. 12 illustrates another illustrative embodiment braking system 160 for an ATV. Braking system 160 includes many of the same components of braking system 24 of FIG. 2 and braking system 80 of FIG. 8, wherein like components are identified by like reference numerals. For example, braking system 160 includes a front master cylinder 34, a rear master cylinder 32, front brake assemblies 28a and 28b, and rear brake assemblies 100 and 124. In operation, when the front master cylinder 34 is applied, pressurized fluid is supplied to distribution block 40, which then passes through outlet 46 to brake lines 58 and 118. From brake lines 58 and 118, pressurized fluid is provided to both front brake assemblies 28a, 28b and rear brake assemblies 100, 124. When foot master cylinder 32 is applied, pressurized fluid is supplied to distribution block 40. Piston 52 moves, thereby forcing pressurized fluid through outlet 46 and simultaneously to front brake assemblies 28a, 28b and rear brake assemblies 100, 124.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An all terrain vehicle including an engine supported by a frame, front and rear axles supported by the frame, a transmission configured to transmit power from the engine to the at least one of the axles, and a braking system configured to stop the all terrain vehicle, the braking system including:
   a front brake assembly operably coupled to the front axle, the front brake assembly including a first input;
   a rear brake assembly operably coupled to the rear axle, the rear brake assembly including first and second inputs;
   first and second hydraulic master cylinders configured to develop hydraulic pressure to actuate at least one of the front and rear brake assemblies to slow the all terrain vehicle, the second hydraulic master cylinder in direct communication with the second input of the rear brake assembly; and
   a distribution block including a body defining a cavity and a piston movably received within the cavity, a first inlet in communication with the cavity and the first hydraulic master cylinder, a second inlet in communication with the cavity and the second hydraulic master cylinder, a first outlet in communication with the cavity and the first input of the front brake assembly, and a second outlet in communication with the cavity and the first input of the rear brake assembly, wherein the piston has a first position within the cavity such that hydraulic pressure received from the first master cylinder at the first inlet causes hydraulic pressure at the first and second outlets to actuate the front and rear brake assemblies, and the piston has a second position within the cavity such that hydraulic pressure received from the second master cylinder at the second inlet causes hydraulic pressure at the first outlet to actuate the front brake assembly.

2. The all terrain vehicle of claim 1, wherein the front and rear brake assemblies include discs coupled to the front and rear axles, respectively.

3. The all terrain vehicle of claim 2, wherein the front and rear brake assemblies include front and rear brake calipers, the front brake caliper being positioned adjacent to the front brake disc, the rear brake caliper being positioned adjacent to the rear brake disc.

4. The all terrain vehicle of claim 1, wherein the distribution block is a one-way slave cylinder.

5. The all terrain vehicle of claim 1, further including a differential rear axle system.

6. The all terrain vehicle of claim 1, wherein the first hydraulic master cylinder is actuated by a foot control.

7. The all terrain vehicle of claim 1, wherein the second hydraulic master cylinder is actuated by a hand control.

8. The all terrain vehicle of claim 1, wherein the braking system further includes a proportioning valve configured to control hydraulic pressure.

9. A braking system for an all terrain vehicle including:
   a hand control including a first master cylinder;
   a foot control including a second master cylinder;
   a front brake assembly;
   a rear brake assembly; and
   a distribution block including a cavity and a piston, a first inlet fluidly coupled to the cavity and the hand control, a second inlet fluidly coupled to the cavity and the foot control, a first outlet positioned in spaced relation to the first inlet and fluidly coupled to the cavity and the front brake assembly, and a second outlet positioned in spaced relation to the second inlet and fluidly coupled to the cavity and the rear brake assembly, the first inlet of the distribution block receiving fluid pressure input from the first master cylinder of the hand control to actuate at least one of the front and rear brake assemblies by fluid pressure from the cavity passing through at least one of the first and second outlets, the second inlet of the distribution block receiving fluid pressure input from the second master cylinder of the foot control to actuate both the front and rear brake assemblies by fluid pressure from the cavity passing through the first and second outlets wherein the piston has a first position within the cavity such that hydraulic pressure received from the first master cylinder at the first inlet causes hydraulic pressure at the first and second outlets to actuate the front and rear brake assemblies, and the piston has a second position within the cavity such that hydraulic pressure received from the second master cylinder at the second inlet causes hydraulic pressure at the first outlet to actuate the front brake assembly.

10. The braking system of claim 9, wherein the distribution block is a one way slave cylinder.

11. The braking system of claim 9, wherein the front and rear brake assemblies each include at least a disc and a caliper.

12. The braking system of claim 9, wherein the rear brake assembly includes a dual input rear caliper.

13. The braking system of claim 9, further including a differential rear axle system.

14. The braking system of claim 9, further comprising a proportioning valve configured to regulate hydraulic pressure.

15. An all terrain vehicle including an engine supported by a frame, front and rear axles supported by the frame, a transmission configured to transmit power from the engine to the at least one of the axles, and a braking system configured to stop the all terrain vehicle, the braking system including:
   a front brake assembly operably coupled to the front axle, the front brake assembly including a first input;
   a rear brake assembly operably coupled to the rear axle, the rear brake assembly including first and second inputs;
   first and second hydraulic master cylinders configured to develop hydraulic pressure to actuate at least one of the front and rear brake assemblies to slow the all terrain vehicle, the second hydraulic master cylinder in direct communication with the second input of the rear brake assembly;
   a foot control adapted to actuate one of the first and second master cylinders;
   a hand control adapted to actuate the other of the second and first master cylinders; and
   a distribution block including a body defining a cavity and a piston movably received within the cavity, a first inlet in communication with the cavity and the first hydraulic master cylinder, and a second inlet in communication with the cavity and the second hydraulic master cylinder, a first outlet in communication with the cavity and the first input of the front brake assembly, and a second outlet in communication with the cavity and the first input of the rear brake assembly, wherein the piston has a first position within the cavity such that hydraulic pressure received from the first master cylinder at the first inlet causes hydraulic pressure at the first and second outlets to actuate the front and rear brake assemblies, and the piston has a second position within the cavity such that hydraulic pressure received from the second master cylinder at the second inlet causes hydraulic pressure at the first outlet to actuate the front brake assembly.

16. The all terrain vehicle of claim 15, wherein the front and rear brake assemblies are one of disc brakes and drum brakes.

17. The all terrain vehicle of claim 15, wherein the rear axle is a differential axle system.

18. The all terrain vehicle of claim 15, further including a proportioning valve configured to control hydraulic pressure.

19. An all terrain vehicle including an engine supported by a frame, front and rear axles supported by the frame, a transmission configured to transmit power from the engine to the at least one of the axles, and a braking system configured to stop the all terrain vehicle, the braking system including:
- a front brake assembly operably coupled to the front axle;
- a rear brake assembly operably coupled to the rear axle;
- a first hydraulic master cylinder configured to develop hydraulic pressure to simultaneously actuate the front and rear brake assemblies;
- a distribution block including a cavity and a piston movably received within the cavity, a first outlet fluidly coupled to the cavity and the front brake assembly, a second outlet fluidly coupled to the cavity and the rear brake assembly, a first inlet positioned in spaced relation to the first outlet and fluidly coupled to the cavity and the first hydraulic master cylinder, and a second inlet positioned in spaced relation to the second outlet and fluidly coupled to the cavity and the second hydraulic master cylinder, the piston fluidly sealing the first outlet and the second inlet from the second outlet and the first inlet;
- a second hydraulic master cylinder configured to develop hydraulic pressure to simultaneously actuate the front and rear brake assemblies;
- a foot control adapted to actuate the first master cylinder;
- a hand control adapted to actuate the second master cylinder; and
- wherein the first inlet of the distribution block is configured to receive fluid pressure input from the first hydraulic master cylinder to actuate the rear brake assembly by fluid pressure passing from the first inlet through the cavity to the second outlet and to actuate the front brake assembly by moving the piston to generate fluid pressure at the first outlet, and the second inlet of the distribution block is configured to receive fluid pressure input from the second hydraulic master cylinder to actuate the front brake assembly by fluid pressure passing from the second inlet through the cavity to the first outlet.

20. The all terrain vehicle of claim 19, wherein:
the front brake assembly includes a first input;
the rear brake assembly includes first and second inputs;
the first hydraulic master cylinder is fluidly coupled directly to the second hydraulic master cylinder and to the second input of the rear brake assembly; and
the second hydraulic master cylinder is fluidly coupled to the first inputs of the front and rear brake assemblies.

21. The all terrain vehicle of claim 19, wherein the rear axle is a differential axle system.

* * * * *